United States Patent
Vehmas

(10) Patent No.: US 6,172,336 B1
(45) Date of Patent: Jan. 9, 2001

(54) HEATING GLASS IN TEMPERING FURNACE

(75) Inventor: Jukka Vehmas, Tampere (FI)

(73) Assignee: Uniglass Engineering Oy, Tampere (FI)

(*) Notice: Under 35 U.S.C. 154(b), the term of this patent shall be extended for 0 days.

(21) Appl. No.: 09/194,270

(22) PCT Filed: May 21, 1997

(86) PCT No.: PCT/FI97/00304

§ 371 Date: May 18, 1999

§ 102(e) Date: May 18, 1999

(87) PCT Pub. No.: WO97/44284

PCT Pub. Date: Nov. 27, 1997

(30) Foreign Application Priority Data

May 22, 1996 (FI) .......................................... 962162

(51) Int. Cl.[7] .......................... C03B 25/80; C03B 27/12; F27B 9/36
(52) U.S. Cl. .......................... 219/388; 65/162; 65/273; 65/350
(58) Field of Search .......................... 219/388; 392/417; 65/114, 117, 118, 162, 350

(56) References Cited

U.S. PATENT DOCUMENTS

| | | | |
|---|---|---|---|
| 3,744,985 | 7/1973 | Peternel | 65/104 |
| 4,390,359 | 6/1983 | Reunamaki | 65/114 |
| 4,529,380 | 7/1985 | McMaster | 432/144 |
| 4,601,743 * | 7/1986 | Canfield | 65/162 |
| 4,807,144 | 2/1989 | Joehlin et al. | 364/473 |
| 4,824,464 * | 4/1989 | Perin et al. | 65/114 |
| 5,028,250 * | 7/1991 | Deb et al. | 65/289 |
| 5,122,180 | 6/1992 | Mathivat et al. | 65/162 |
| 5,337,393 * | 8/1994 | Reunamaki | 392/417 |
| 5,368,624 * | 11/1994 | Lehto et al. | 65/29.19 |

FOREIGN PATENT DOCUMENTS

| | | |
|---|---|---|
| 0416332 | 3/1991 | (EP) . |
| 62043 | 7/1982 | (FI) . |
| 96043 | 7/1982 | (FI) . |
| 83072 | 2/1991 | (FI) . |
| 86407 | 5/1992 | (FI) . |
| 93719 | 2/1995 | (FI) . |
| 97378 | 8/1996 | (FI) . |
| 9803439 | 1/1998 | (WO) . |

* cited by examiner

Primary Examiner—Joseph Pelham
(74) Attorney, Agent, or Firm—Ladas and Parry

(57) ABSTRACT

A method and an equipment for heating glass in a tempering furnace provided with rollers. In a tempering furnace glass (3) is heated from above with upper resistors (4) and from below with lower resistors (5). The heating resistors (4, 5) are dimensioned such that their combined power is greater than the maximum heating power needed by the furnace, and that the resistors are controlled such that the maximum amount of resistor power being used simultaneously corresponds to the maximum heating power needed by the furnace. This allows heat to be directed at a desired place in the furnace also at the initial stage of heating, and a single resistor is efficient and fast, allowing heat to be directed quickly at places where it is needed.

11 Claims, 1 Drawing Sheet

HEATING GLASS IN TEMPERING FURNACE

FIELD OF THE INVENTION

The invention relates to a method of heating glass in a tempering furnace provided with rollers, in which method the glass is heated from above with upper resistors and from below with lower resistors.

The invention also relates to an equipment for heating glass in a tempering furnace provided with rollers, the equipment comprising upper resistors for heating glass from above and lower resistors for heating glass from below.

BACKGROUND

Current glass tempering machines employ what are known as oscillating roller furnaces in which glass is heated mainly by radiation. In the tempering process the temperature of the glass is increased above the softening point of glass in order to enable the glass to be tempered. This temperature is between 610 and 625° C. depending on the thickness of the glass. The glass is then cooled at desired speed typically using forced convection whereby air jets are blown at the glass from above and from below. This method enables high heat-transfer coefficients, necessary when thin glass is concerned in order to achieve a sufficient temperature difference between the surface and centre of the glass. Examples of oscillating roller furnaces are disclosed in Fl patents 83,072 and 86,407.

When heating glass in a tempering furnace, where the glass is oscillated in a reciprocating manner upon rollers during the entire heating process and the glass is heated with resistors located above and below the glass, heat transfer to the glass is difficult to control. A reason for this is that heat transfer from massive rollers to glass, for example, is predominant particularly at the initial heating stage. In this case t e lower surface of the glass is subjected to a greater thermal current (than) above, even if the heat transfer of the upper surface had been intensified e.g. by utilizing forced convection. This makes the edges of the glass bend upwards and the contact surface between the glass and the rollers becoming quite indefinite. Furthermore, the surface pressure at the point of contact where the glass touches the roller becomes high enough to subject the glass to optical faults, i.e. white marks and scratches, breaking the surface of the glass. Furthermore, the conditions in the furnace change during the heating period. The temperature of the glass changes relative to time and particularly the heat transfer from the rollers diminishes as the temperature of the glass approaches the temperature of the rollers and as the temperature of the rollers falls at the initial stage of the heating period when the thermal current taken up by the glass is at its highest. This causes the problem of keeping the heating of the upper and lower parts of the furnace equalized during the entire heating period.

At the start of heating, a power equal to the combined power of the resistors is connected to the furnace, i.e. each resistor is switched on at maximum heating power. In this case it is impossible to adjust the furnace, and it is impossible to control the actual relative power of the upper and lower sides because of resistor delays. In this case unevenly arranged glass loads in the furnace cause the furnace to become cooled in places comprising most glass, even though the need for heating is greatest in these places.

SUMMARY OF THE INVENTION

It is an object of the present invention to provide a method and an equipment for avoiding the above drawbacks.

The method of the invention is characterized in that the heating resistors are dimensioned such that their combined power is greater than the maximum heating power needed by the furnace, and that the resistors are controlled such that the maximum amount of resistor power being used simultaneously corresponds to the maximum heating power needed by the furnace.

The equipment of the invention is characterized in that the combined power of the heating resistors is greater than the maximum heating power needed by the furnace, and that the resistors are coupled to be controlled such that the maximum amount of resistor power being used simultaneously corresponds to the maximum heating power needed by the furnace.

It is an essential idea of the invention that the tempering furnace is heated with heating resistors dimensioned such that their combined power is higher than the heating power needed by the furnace, and that the resistors are controlled such that the maximum amount of resistor power being used simultaneously corresponds to the maximum heating power needed by the furnace. It is the idea of a preferred embodiment that the resistors are divided into separate control groups. It is the idea of another preferred embodiment that the connected electric load of the furnace is smaller than the combined power of the resistors.

It is an advantage of the invention that heat may be directed at a desired place in the furnace also at the initial stage of heating. Furthermore, a single resistor is efficient and fast, allowing heat to be directed quickly at places where it is needed. If needed, strong heat direction bands may also be achieved. Furthermore, owing to limited power, the furnace cannot be overheated and left uncontrolled. Furthermore, the investment cost of electric distribution boards does not rise unreasonably high as the connected load remains at a normal level. Still further, the customer may make the decision on the size of the connected load in accordance with the supply of energy. On the whole, the glass load can be heated as uniformly as possible over the entire surface, the entire load being within a small temperature tolerance at the final heating stages. This way the average outlet temperature of the load may be kept as low as possible.

In connection with the present invention, the term highest heating power needed by a furnace refers to an power 2,5 times the average theoretical power needed by glass for raising the temperature of the glass from 20° C. to 620° C. during a heating period of 40 seconds per thickness millimetre of the glass. In practical glass production it has been found that it is not worth using a temperature exceeding said maximum power needed by the furnace, as in practice the glass cannot initially be heated faster than a preset speed, owing to the poor thermal conductivity of glass. Problems arise particularly when heating thick glass which breaks in the furnace if heated too rapidly, i.e. using too high a heating power. An example for a 4mm thick glass per glass square yields:

$$P = \frac{Q}{d \times 40\ s} = \frac{m \times c(T) \times [T(\text{end}) - T(\text{start})]}{4 \times 40} = 41\ \text{kW/m}^2,$$

where P=average power required by glass
Q=energy needed to raise temperature
d=thickness of glass, mm
m=1 m² glass mass=10 kg
c(T)=specific heat power of glass, dependent on the temperature of the glass, range of variation about 820 to 1260 J/kgK T(end)=final temperature of glass=620° C.

T(start)=initial temperature of glass=20° C.

In this case the maximum power demand is 100 to 108 kW per glass square. Practically, the maximum power demand does not depend on the thickness of the glass. The maximum power demand includes loss through the furnace insulants, etc.

BRIEF DESCRIPTION OF THE DRAWINGS

The invention will be described in more detail in the attached drawing in which.

DETAILED DESCRIPTION

Figure 1:
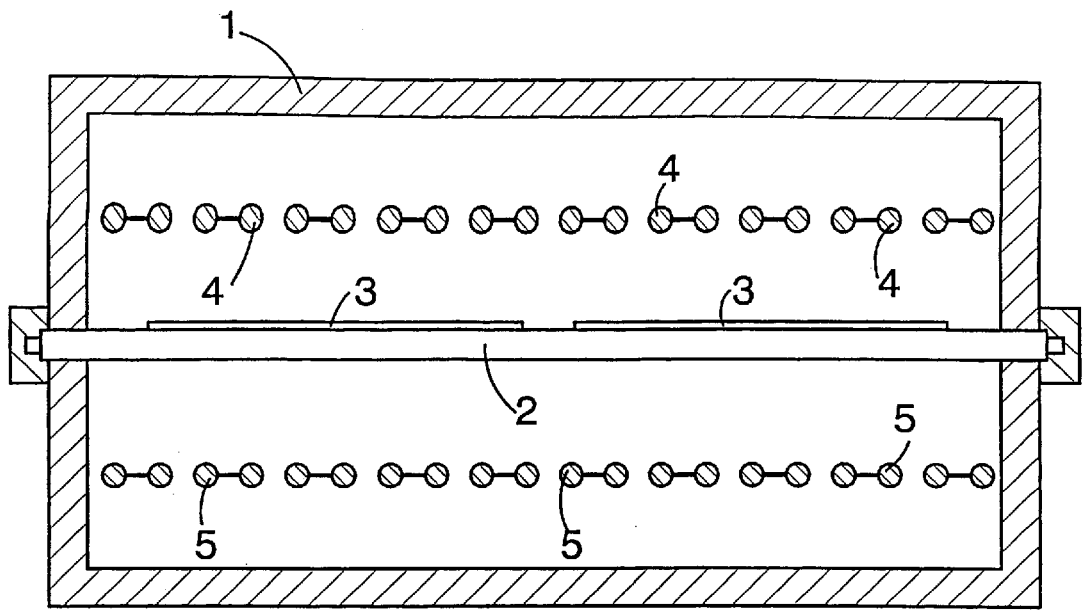
FIG. 1 schematically shows a tempering furnace seen in the travel direction of the glass and in section.
Figure 2:
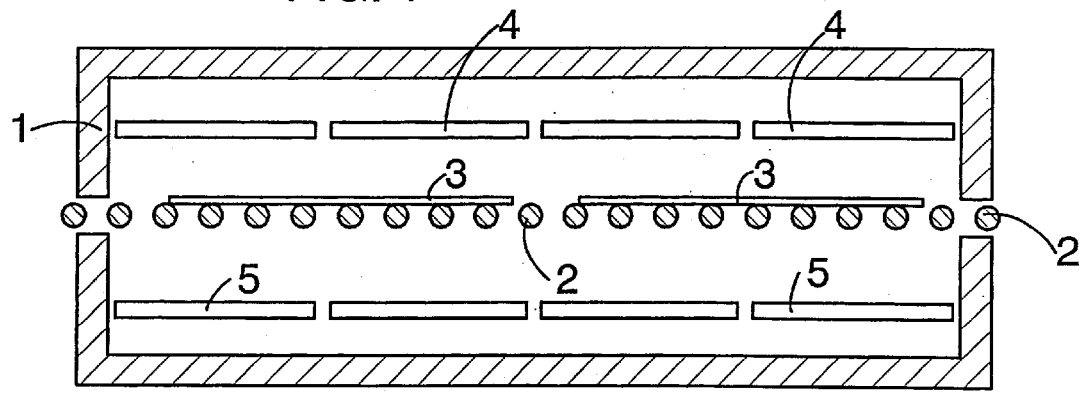

FIG. 2 is a sectional side view of the furnace of FIG. 1.

FIG. 1 schematically shows a tempering furnace according to the invention, seen in the travel direction of the glass and in section. The tempering furnace comprises a housing 1 and rollers 2 upon which glass sheets 3 are placed. In the tempering furnace the glass sheets 3 undergo a back-and-forth movement, i.e. are oscillated, by means of the rollers 2 in a manner fully known per se, for arranging the roller support points evenly upon the entire glass through the entire heating stage. This is a way to minimize deformations in the glass optics caused by uneven support of the glass.

The glass sheets 3 are heated from above with upper resistors 4 and from below with lower resistors 5 in a manner fully known per se. Upper blowpipes may be arranged above the glass sheets 3 and lower blowpipes may be arranged under the glass sheets, whereby, when necessary, the upper blowpipes may be utilized to blow warm air at the upper surfaces of the glass sheets 3, i.e. forced convection may be utilized. Similarly, the lower blowpipes may be used to either cool the furnace from below the glass sheets 3, or to heat it, according to the need. Said blowpipes have not been shown in the attached Figure for the sake of clarity.

The upper resistors 4 and the lower resistors 5 are mounted in pairs. Thus, if a resistor breaks, the other resistor of the pair remains in use. The resistors are preferably of an open resistor structure, operating with a very small delay and having a small mass. Furthermore, the efficiency of the resistors allows very sharp heating profiles. Managing the equalization of temperature in the furnace is easy, too, owing to a smaller hot mass in the furnace.

FIG. 2 is a sectional side view of the furnace of FIG. 1. The numbering of FIG. 2 corresponds to that of FIG. 1. In the longitudinal direction of the furnace, both the upper resistors 4 and the lower resistors 5 have preferably been divided into several parts, whereby heating may be directed at the necessary point also in the longitudinal direction of the furnace by controlling the resistors.

In accordance with the invention, the upper resistors 4 and the lower resistors 5 are dimensioned such that the combined power of the resistors exceeds the maximum heating power needed by the furnace. Most preferably the combined power of the resistors is about 1,2 to 1,7 times higher than the maximum power needed by the furnace. This way the furnace may be controlled also at the initial heating stage in a manner required by the process, as a resistor reserve is available the whole time. Furthermore, the equalization of temperature in the furnace stays in balance. Still further, a single resistor is rapid and, then again, a single resistor or resistor group enables very strong heating profiles to be directed at the glass. The connected electricity load can be dimensioned smaller than the combined power of the resistors, resulting in savings in electric distribution board and cabling costs.

In the following a heating period utilizing the method and equipment of the invention will be described by way of an example. In the example it is assumed that a single-chamber furnace is concerned, that the heating is effected mainly by radiation, that the furnace comprises ceramic rollers 2 for oscillating the glass in a reciprocating manner during the entire heating period, and that the glass is 4-mm float glass provided with a coating having a reflection coefficient of about 40%.

At the initial stage, i.e. about 10 seconds before the load is transferred to the furnace, an attempt is made to get the furnace to an optimally advantageous state from the point of view of the heating of the incoming load. Attempts are made in this connection to get the upper and lower parts of the furnace well equalized, so that once the glass 3 enters the furnace, it will be subjected to an optimally equal thermal current on both the upper and the lower part. Because of the coating of the upper surface of the glass 3, 40% of the radiation directed at the upper side is reflected back, and the lower side again receives a large thermal current owing to the hot roller 2. This is why attempts are made to transfer the thermal current from the lower side of said reflective glass 3. In practice this is done by cooling the rollers 2 and shadowing out the lower resistors 5. This may be implemented e.g. by keeping the temperature of the lower resistors 5 as low as possible and by cooling the lower part by means of blowpipes. Correspondingly, attempts are made to raise the temperature of the upper resistors 4 moderately high, so that the thermal current terminating in the glass would be sufficient.

When the glass 3 is transferred to the furnace, its temperature starts to rise very rapidly. At the same time, the glass 3 is oscillated in a reciprocating manner upon ceramic rollers 2. The glass 3 should be subjected throughout to an equal thermal current on the upper and lower sides and at each point of the surface. In addition, the heating must not be too fast in order for the centre of the glass in the direction of the thickness, too, to have time to be heated to a sufficiently high temperature. While the glass 3 is in the furnace, the resistors are controlled during the first 10 seconds such that the power demand of the upper resistors 4 is 80 to 100% and that of the lower resistors 20 to 50%. The upper resistors 4 and the lower resistors 5 are dimensioned equal as to their power, whereby, when needed, an adequate power is obtained from the lower resistors 5, too, e.g. when the furnace is being equalized. The above mentioned power demand values ensure a sufficient total furnace heating power at said initial heating stage if the resistors are dimensioned e.g. 1,5 times larger than the required maximum heating power. At the same time, the thermal current on the lower side may be reduced by means of cooling pipes. The furnace then has adjustment reserve both owing to the resistor power reserve on the upper side and owing to the cooling power on the lower side. A horizontal heating profile may be used in the upper and lower resistors 4 and 5, whereby typically a 100% power demand is given to the middle resistors of the furnace and an about 80% power demand to the outermost when comparing the power demands of the resistors.

When heating glass further temporally from about 10 seconds to about 100 seconds, the speed with which the temperature of the glass 3 rises continues to fall owing to the temperature difference between the furnace and the glass 3. The thermal current on the lower side, in particular, diminishes relative to that on the upper side, since the difference in temperature of the glass 3 and the rollers 2 decreases relatively more rapidly as compared with the temperature difference between the upper resistors 4 and the glass 3. The rollers 2 touching the glass 3 emit more heat to the glass 3 than transferred at the same time from the other parts of the furnace. The upper surface of the rollers 2 comprises the glass which insulates the upper resistors 4 and the rollers 2 one from another, and the lower side comprises cooling pipes for cooling the rollers 2. In addition, the temperature of the lower resistors 5 is kept low. For these reasons the temperature of the rollers 2 starts to fall slowly. This is why the cooling power may be decreased and correspondingly the power demand of the lower side may be increased slowly in relation to the power demand of the upper resistors 4 such that, in the case presented, at about 100 seconds from the start of heating, the cooling of the lower side can be totally disconnected, and at the same time the demand of the upper and lower resistors 4 and 5 is about equal.

When glass is heated to tempering temperature, which takes place e.g. 100 to 160 seconds from the start of heating, blowing hot air at the lower surface of the glass 3 is started at the start of said stage, e.g. at about 100 seconds, i.e. the lower surface of the glass 3 is subjected to additional heating by forced convection. The power demand of the lower resistors 5 is increased continuously relative to the power demand of the upper resistors 4, although the maximum power demand falls during said heating period. For example, when heating glass 3 with a heating radiation reflective upper surface, it is advantageous to increase the power demand of the upper resistors 4 to at least 80% even at the final stages of the heating period, e.g. about 10 seconds before the glass 3 is pulled out of the furnace for temper cooling. This way a sufficiently high starting temperature of the upper resistors 4 is achieved for the next load. Although the resistors 4 and 5 are efficient and rapid, they do have a slight delay. Therefore, it pays to start the heating of the upper resistors 4 at this early a stage. On the other hand, due to said delay, raising the temperature of the upper resistors 4 does not cause damage to the final heating since the temperature of the upper resistors 4 has not yet risen too high.

At about 160 seconds, the glass 3 is at tempering temperature and is transferred to temper cooling. The furnace is then empty for about 10 seconds before the next load is transferred therein. During this time, a suitable temperature should be achieved in the furnace for the next load. Therefore, the resistance wire of every single resistor must be as efficient as possible and have a small mass, i.e. be rapid, for the desired initial conditions to be reached as the following load enters the furnace. In addition, the conditions in the furnace should remain as favourable as possible at the final stage of the previous load in view of the following load, in order to achieve the desired equalization of temperature. For this reason, in the case described in the previous paragraph, when the glass is being heated to tempering temperature, even the lower side is subjected to forced convection whereby the lower resistors 5 do not have to be switched on at the final heating stage, which would be harmful at the initial stage of the following heating period. During the empty stage, the lower part is only cooled.

The drawing and the related description are only intended to illustrate the idea of the invention. As to its details, the invention may vary within the scope of the claims. This means that the resistors may be manually or automatically controlled by means of a plurality of different adjustment parameters. Such adjustment parameters include e.g. furnace temperatures on different sides of the furnace, the heating curve of glass, also measured by a pyrometer, development of the temperature difference between the glass 3 and the roller 2, and information concerning the shape and load degree of the load.

What is claimed is:

1. A method of heating glass in a tempering furnace provided with rollers, in which method the glass is heated from above with upper resistors and from below with lower resistors said method comprising dimensioning the heating resistors are such that their combined power is greater than the maximum heating power needed by the furnace at full capacity, and controlling the resistors such that the maximum amount of resistor power being used simultaneously corresponds to the maximum heating power needed by the furnace.

2. A method as claimed in claim 1, wherein the combined power of the resistors is 1.2 to 1.7 times the maximum heating power required by the furnace.

3. A method as claimed in claim 1, wherein at least 20% of the resistors are disconnected at all times.

4. A method as claimed in claim 3, wherein in an initial heating period at least 80% of the power of the upper resistors utilized, and at most 50% of the power of the lower resistors is utilized.

5. A method as claimed in claim 1, a plurality of resistors are arranged longitudinally in parallel in the travel direction of the glass (3) in the furnace, and that the resistors are divided into at least two parts in the longitudinal direction of the furnace, and controlled each resistor part is separately.

6. A method as claimed in claim 1, wherein the electric power delivered by the resistors is smaller than the combined power capacity of the resistors.

7. An equipment for heating glass in a tempering furnace provided with rollers, the equipment comprising upper resistors for heating glass from above and lower resistors for heating glass from below, the combined power of the heating resistors at maximum output being greater than the maximum heating power needed by the furnace at full capacity, and the resistors being coupled to be controlled such that the maximum amount of resistor power being used simultaneously corresponds to the maximum heating power needed by the furnace.

8. An equipment as claimed in claim 7, wherein the combined power of the resistors is 1.2 to 1.7 times the maximum heating power required by the furnace.

9. An equipment as claimed in claim 7 or 8, wherein the resistors are arranged longitudinally in the travel direction of the glass several resistors being arranged respectively side by side, the resistors being divided in a plurality of parts in the longitudinal direction, each resistor being controlled separately.

10. An equipment as claimed in claim 7 wherein the resistors are open resistors.

11. An equipment as claimed in claim 7 wherein the resistors are connected in pairs.

* * * * *